United States Patent Office 3,485,765
Patented Dec. 23, 1969

---

3,485,765
AZO MODIFIER CONTAINING PHOTOTROPIC
COMPOSITIONS
Gordon C. Newland, Kingsport, Tenn., assignor to Eastman Kodak Company, Rochester, N.Y., a corporation of New Jersey
No Drawing. Filed July 6, 1966, Ser. No. 563,046
Int. Cl. F21v 9/10; G02b 5/20
U.S. Cl. 252—300     15 Claims

ABSTRACT OF THE DISCLOSURE

A phototropic composition comprising a 1,3,3-trihydrocarbylspirobenzopyranindoline having substitution in at least one of the benzopyran moiety and the indoline moiety and an azo modifier.

---

The present invention relates to phototropic compositions and, more particularly, to phototropic compositions in which the phototropic properties can be altered to suit a particular application.

Phototropes are compounds which are characterized by their ability to change color when exposed to sunlight. Of particular interest are those phototropes which not only change color on exposure to sunlight, but in which the change is reversible when the phototrope is returned to darkness, dim light, or incandescent light free of ultraviolet radiation. Reversible photochromic plastics obtained by dissolving such phototropes in thermoplastic resins are useful in computers, in memory storage, in photographic applications, in structural applications such as sunlights, windows, decorative panels and the like, in packaging, and in protective eyeglasses. The last application is characterized by compositions having suitable color and optical density to protect the eyes from sunlight. The generally accepted optical density range is from 0 to 0.4 in dim light, and above 1.4 in very bright light such as reflected from snow or sand. Another criterion of utility is the rate at which the phototropic composition changes as the intensity of the light is changed. Thus, eyeglasses used for protection against atomic flare require an almost instantaneous change from an optical density of 0 to .20 to completely opaque. Other criteria of utility are the stability of the phototrope to continued exposure and the ability of the phototrope to continue the color change as the light change is repeated over and over again.

Many phototropes, inherently or when incorporated into plastics, are deficient in these properties, i.e. they tend to be unstable, to react sluggishly to light change, and tend to fatigue. It is, therefore, desirable to improve these properties and furthermore to beneficially affect the nature of the color change to make such color change particularly suitable for a particular application.

It is, therefore, an object of the present invention to provide phototropic compositions having properties suitable for a wide range of applications.

It is another object of the present invention to produce phototropic compositions in which the rate of color change with change in light intensity is faster.

It is still another object of the present invention to produce phototropic compositions which are more stable to light.

It is yet another object of the present invention to provide means for controlling the color change of phototropic compositions.

Other objects will become apparent from the following description and claims.

The phototropic compositions of the present invention comprise a solution of (A) a phototrope having the general formula

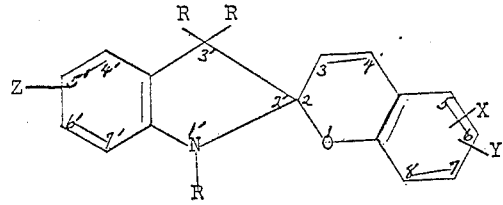

wherein X, Y, and Z are the same or different monovalent radicals selected from the group consisting of hydrogen, carboxyl (—COOH), alkoxy, nitro, hydroxyl, alkoxycarbonyl, cyano, halogen, amino, amido, alkylsulfone, arylsulfone, acyl and acylamido, in which the hydrocarbyl groups attached to functional moieties containing such have not more than 8 carbon atoms and are preferably alkyl radicals of 1 to 4 carbon atoms, at least one of said substituents being other than hydrogen in said phototrope, said substituent Z being located in positions 4' to 7', inclusive, and said substituents X and Y being located at positions 5 to 8, inclusive; and wherein R is a hydrocarbyl radical such as alkyl, cycloalkyl, alkenyl, aryl, alkaryl, and aralkyl, having not more than 20 carbon atoms and preferably is an alkyl radical of 1 to 8 carbon atoms; and (B) a modifier comprising compounds containing moieties having the formulas

and

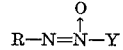

wherein R is a substituted or unsubstituted aromatic or heterocyclic radical and Y is a substituted or unsubstituted aromatic radical, and/or (C) non-azo modifiers as defined in Table A. The medium in which the phototrope and the modifier are dissolved can be liquid or solid. Liquid media which can be employed include, in general, any inert solvent and in particular such solvents as hydrocarbon solvents, halogenated hydrocarbon solvents, alcohols, esters, ketones, ethers, and the like. Preferably, however, the phototropic composition of the present invention is employed in solution in a solid and more specifically in the form of a solution in a thermoplastic resin.

The concentration in which the phototrope is employed in the compositions of the present invention can vary widely and is best determined experimentally for each application, since the phototropic properties of a composition are not only affected by the particular modifier employed, but also by the particular phototrope, the particular medium, as well as the concentration of the phototrope. The measurements of phototropic properties such as described herein can be employed to establish phototropic compositions best suited for the particular application intended. In general, however, the phototropes are employed as relatively dilute solutions and concentrations within the range of 0.001 to 10% by weight of the medium are satisfactory for most applications. The concentration of modifier employed can be similarly widely varied and the ratio of phototrope to modifier can range from 1:100 to 100:1.

The spirobenzopyranindolines employed in the compositions of the present invention are generally prepared by the reaction of correspondingly substituted 2-methyleneindolines with correspondingly substituted hydroxybenzaldehydes in the presence of a solvent such as ethanol with or without a catalyst such as piperidine. The initial condensation product of the 2-methyleneindoline is converted to the spirobenzopyranindoline with base.

Instead of the 2-methyleneindoline, the corresponding indoleninium salt can be employed. Phototropic spirobenzopyranindolines include:

8-methoxy-5'-methoxycarbonyl-1',3',3'-trimethyl-6-nitrospiro (2H-1-benzopyran-2,2'-indoline),
5'-methoxycarbonyl-1',3',3'-trimethyl-6-nitrospiro (2H-1-benzopyran-2,2'-indoline),
6-methoxy-5'-methoxycarbonyl-1',3',3'-trimethyl-8-nitrospiro (2H-1-benzopyran-2,2'-indoline),
5'-methoxycarbonyl-1',3',3'-trimethyl-7-diethylaminospiro (2H-1-benzopyran-2,2'-indoline),
5'-methoxycarbonyl-1',3',3'-trimethyl-7-hydroxyspiro (2H-1-benzopyran-2,2'-indoline),
5'-methoxycarbonyl-1',3',3'-trimethyl-6-hydroxyspiro (2H-1-benzopyran-2,2'-indoline),
5'-methoxycarbonyl-1',3',3'-trimethyl-8-methoxyspiro (2H-1-benzopyran-2,2'-indoline),
5'-methoxycarbonyl-1',3',3'-trimethyl-8-nitrospiro (2H-1-benzopyran-2,2'-indoline),
5'-methoxycarbonyl-1',3',3'-trimethyl-6,8-dibromospiro (2H-1-benzopyran-2,2'-indoline),
5'-methoxycarbonyl-1',3',3'-trimethyl-6,8-dichlorospiro (2H-1-benzopyran-2,2'-indoline),
5'-methoxycarbonyl-1',3',3'-trimethyl-6,8-dinitrospiro (2H-1-benzopyran-2,2'-indoline),
5'-methoxycarbonyl-1',3',3'-trimethyl-6-bromo-8-nitrospiro (2H-1-benzopyran-2,2'-indoline),
5'-methoxycarbonyl-1',3',3'-trimethyl-6-methoxyspiro (2H-1-benzopyran-2,2'-indoline),
5'-methoxycarbonyl-1',3',3'-trimethyl-6-chlorospiro (2H-1-benzopyran-2,2'-indoline),
5'-methoxycarbonyl-1',3',3'-trimethyl-6-bromospiro (2H-1-benzopyran-2,2'-indoline),
5'-methoxycarbonyl-1',3',3'-trimethyl-6-bromo-8-methoxyspiro (2H-1-benzopyran-2,2'-indoline),
5'-methoxycarbonyl-1',3',3'-trimethyl-6-methoxy-8-bromospiro (2H-1-benzopyran-2,2'-indoline),
5'-methoxycarbonyl-1',3',3'-trimethyl-5-nitro-8-methoxyspiro (2H-1-benzopyran-2,2'-indoline),
5'-methoxycarbonyl-1',3',3'-trimethyl-5,7-dichloro-6-nitrospiro (2H-1-benzopyran-2,2'-indoline),
5'-methoxycarbonyl-1',3',3'-trimethyl-5,6-dinitro-8-methoxyspiro (2H-1-benzopyran-2,2'-indoline),
5'-methoxycarbonyl-1',3',3'-trimethyl-6-nitro-8-fluorospiro (2H-1-benzopyran-2,2'-indoline),
5'-methoxycarbonyl-1',3',3'-trimethyl-6-nitro-8-bromospiro (2H-1-benzopyran-2,2'-indoline),
5'-methoxycarbonyl-1',3',3'-trimethyl-8-hydroxyspiro (2H-1-benzopyran-2,2'-indoline),
5'-acetyl-1',3',3'-trimethyl-5-nitro-8-chlorospiro (2H-1-benzopyran-2,2'-indoline),
5'-methoxycarbonyl-1',3',3'-trimethyl-8-diethylaminospiro (2H-1-benzopyran-2,2'-indoline),
1',3',3'-trimethyl-6-nitrospiro (2H-1-benzopyran-2,2'-indoline),
1',3',3'-trimethyl-8-nitrospiro (2H-1-benzopyran-2,2'-indoline),
1',3',3'-trimethyl-6-nitro-5-chlorospiro (2H-1-benzopyran-2,2'-indoline),
1',3',3'-trimethyl-6-nitro-8-methoxyspiro (2H-1-benzopyran-2,2'-indoline),
1',3',3'-trimethyl-6-nitro-8-chlorospiro (2H-1-benzopyran-2,2'-indoline),
1',3',3'-trimethyl-5-nitro-8-methoxyspiro (2H-1-benzopyran-2,2'-indoline),
1',3',3'-trimethyl-5,6-dinitrospiro (2H-1-benzopyran-2,2'-indoline),
1',3',3'-trimethyl-6-bromo-8-nitrospiro (2H-1-benzopyran-2,2'-indoline),
1',3',3'-trimethyl-6-nitho-8-fluorospiro (2H-1-benzopyran-2,2'-indoline),
1',3',3'-trimethyl-7'-methoxycarbonyl-6-nitrospiro (2H-1-benzopyran-2'-indoline),
1',3',3'-trimethyl-6-nitro-8-iodospiro (2H-1-benzopyran-2,2'-indoline),
8-methoxy-1',3',3'-trimethyl-5'-(methylsulfonyl)-6-nitrospiro (2H-1-benzopyran-2,2'-indoline),
6,8-dibromo-1',3',3'-trimethyl-5'-(methsulfonyl)spiro (2H-1-benzopyran-2,2'-indoline),
5'-methoxy-1',3',3'-trimethyl-8-nitrospiro (2H-1-benzopyran-2,2'-indoline), and
8-methoxy-6'-methoxycarbonyl-1',3',3'-trimethyl-6-nitrospiro (2H-1-benzopyran-2,2'-indoline).

The preferred phototropes are those in which Z is hydrogen or an alkoxycarbonyl radical and X and Y are nitro groups, or a nitro group in combination with hydrogen, methoxy group or a halogen, or halogens.

Any azo compound which contains moieties having the formulas

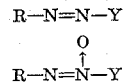

wherein R is a substituted or unsubstituted aromatic or heterocyclic radical and Y is substituted or unsubstituted aromatic radical can be employed to control and modify the phototropic properties of the compositions of the present invention. The azo modifiers of the present invention include, for example, azobenzene wherein R and Y are benzene rings as well as mono- and poly-substituted azobenzenes in which R and Y are substituted with alkyl, aryl, cycloalkyl, alkoxy, aryloxy, amino, halogen, amido, acylamido, hydroxy, carboxyl, sulfonyl, sulfamido, nitro, dialkylamino, cyanoalkylamido, alkylhydroxyalkylamino, bis beta hydroxyalkyl amino, triazeno, beta hydroxyalkylamino, cyanoalkylhydroxyalkylamino, alkylcyanoalkylamino, alkyl beta, gamma-dihydroxypropylamino, bis(cyanoalkyl)amino, cyano, carboaryloxy, sulfonamido, and dialkylamido groups, as well as azo compounds in which one or more benzene rings are condensed with the benzene rings attached to the nitrogen of the azo groups such as in naphthyl groups. The substituents themselves, particularly in the case of aryl substituents, can be additionally substituted by one or more of the stated substituents. Heterocyclic radicals include for example pyridine, thiazole, thiophene, furan and pyrimidine radicals as well as the mono- and poly-substituted heterocyclic radicals substituted by the above groups and in the same manner as the benzene rings of azobenzene. The non-azo modifiers of the present invention are defined as the compounds set forth in Table A.

TABLE A 2,6-dimethyl-4H-pyran-$\Delta^{4,\alpha}$-malonitrile
1-benzoyl-2-salicylidenehydrazine
Carbon black
Gallium
N-salicylidene-5-t-bu salicylhydrazide
1,3,5-trinitrobenzene
p-Hydroxybenzophenone
2,4-dihydroxy-3,5-dibenzoylbenzoic acid
2,4-dimethoxybenzophenone
2-hydroxy-4-dodecyloxybenzophenone
5-(p-dimethylaminobenzylidene) rhodanine
Phenyl-(2H)-benzotriazole
2-(2-hydroxyphenyl)-5-phenyl-1,3,4-oxadiazole
2-hydroxy-5-nitrobenzophenone
2-hydroxy-4,4'-dimethoxy-5-nitrobenzophenone
5-benzylidene-2,4-thiazolidinedione
Nickel acetyl acetonate
Nickel chelate of 2-hydroxy-4-dodecyloxybenzophenone
Manganese-p-aminosalicyclate
Manganese salt of 2,4-dihydroxybenzophenone
1,3,6,8-tetranitrocarbazole
Phenyl salicylate
4-dodecyloxy-2-hydroxybenzophenone
Nickel chelate of 4-dodecyloxy-2-hydroxybenzophenone Resorcinol monobenzoate
2,2'-dihydroxy-4,4'-dimethoxybenzophenone
4'-dimethyl stilbazole
Malonic acid, (o-carboxyphenylazo)-diethyl ester
5,12-diethyl-5,12-dihydroquinoxalino-(2,3-b)phenazine
2,4-diphenyl-7-methoxy-4H-1-benzopyran
Terephthalonitrile
2-(anilinomethylidyne)-4,6-dinitrophenol
2,6-diphenyl-4H-pyran-4-one
2,5-cyclohexadiene-$\Delta^{1,\alpha:4,\alpha 1}$-dimalonitrile
2-(o-hydroxytolyl)-2H-benzotriazole
2,2'-dihydroxy-4,4'-didodecyloxybenzophenone
2,4-dihydroxybenzophenone As indicated hereinabove, the phototrope and the modifier are preferably incorporated into plastic compositions. Suitable thermoplastic resins include cellulose esters such as cellulose acetate butyrate; polyolefins such as polyethylene, polypropylene and copolymers of ethylene with vinyl esters or acrylic esters; polyvinyl halides such as polyvinyl chloride, and polyvinylidene chloride, polystyrene, styrene copolymers with butadiene and/or acrylonitrile, acrylic resins such as polymethylmethracylate, polyvinyl acetals such as polyvinyl butyral, polyvinyl alcohol, polyvinyl esters such as polyvinyl acetate, and polyesters such as polyethylene terephthalate. Particularly preferred thermoplastic resins are plasticized and unplasticized cellulose ester resins.

Various means heretofore employed for the compounding of additives with thermoplastic resins can also be employed for the phototropic compositions of the present invention. Such methods include the solution of resin and phototropic composition in a common solvent followed by mixing and evaporation of the solvent, although, preferably, the resin is heated to a sufficiently fluid state above its softening point and then directly admixed with the phototropic composition. Rubber mills, Banbury mixers, and screw extruders are employed in such methods. Care should, of course, be taken that the temperatures employed do not cause the degradation of the components of the mixture. More than one phototrope can be compounded with more than one modifier using the above-indicated media or media which are mixtures of solvents, thermoplastic resins, or thermoplastic resins and solvents. Likewise, more than one modifier may be compounded with a single phototrope to produce the desired degree of activity.

The effect of the modifiers on the phototropic properties of the phototropes employed in the compositions of the present invention is further illustrated by the following examples, in which all parts are by weight unless otherwise indicated.

EXAMPLE 1

A master blend of cellulose acetate butyrate (15% acetyl, 38% butyryl), 100 parts, 12 parts of dibutyl sebacate as plasticizer, and 8-methoxy-5'-methoxycarbonyl-1',3',3'-trimethyl-6-nitrospiro (2H-1 - benzopyran-2,2'-indoline) is prepared by hot roll-compounding, employing temperatures of 270° F. for the front roll and 230° F. for the back roll. The master blend is then diluted with additional cellulose ester and plasticizer to make up the compositions listed in Table I containing 0.3 part of the phototrope and 0.1 part per 100 parts of resin of the additive listed in the table. Compounding is continued, in each instance a uniform blend is obtained. Plates, 50 mil thick, are compression-molded from the blends at 320° F. The phototropic activity of the plates is measured by recording the change in optical density which results when the phototropic plates are removed from dim, incandescent light and exposed to sunlight for three minutes, and by the recovery which is the percentage loss of the developed optical density in sunlight on returning the phototropic plates to dim, incandescent light within a given time period. A photovolt densitometer, Model 520–M, is employed to measure optical density.

TABLE I

| Composition No: | Additive | Optical Density change on irradiation for 3 minutes in sunlight | Percent recovery in 3 minutes in dim incandescent light |
| --- | --- | --- | --- |
| 1 | None | .84 | 26 |
| 2 | N-methyl-p-(o-chlorophenylazo)m-toluidine | 1.30 | 26 |
| 3 | p-Phenylazo-2,5-dimethoxyaniline | 1.30 | 26 |
| 4 | 4-phenylazo-3-hydroxynaphthylamine | 1.36 | 13 |
| 5 | 2,4-bis(phenylazo)resorcinol | 1.40 | 25 |
| 6 | 2,4-di-tert-amyl-6-phenylazophenol | .90 | 22 |
| 7 | 4,4'-azodi(acetamidobenzene) | .90 | 20 |
| 8 | 4,4'-azodianiline | 1.15 | 29 |
| 9 | 3-(2,4-dihydroxyphenylazo)-4-hydroxybenzenesulfonic acid | .82 | 47 |
| 10 | m-(2-hydroxy-5-methylphenylazo)benzoic acid | .68 | 42 |
| 11 | p-(2-thiazolylazo)m-cresol | .88 | 41 |
| 12 | 6,6'-azodiresorcinol-1-benzoate | .61 | 39 |
| 13 | N-(5-benzenesulfamide-2-hydroxyphenyl)-p-(phenylazo)benzene sulfamide | .70 | 37 |
| 14 | N-(p-Hydroxyphenyl)-m-(phenylazo)benzene sulfonamide | .72 | 34 |
| 15 | 6-phenylazo resorcinol | .75 | 32 |
| 16 | p-Phenylazoaniline hydrochloride | .88 | 32 |
| 17 | N,N-dimethyl-3-chloro-4-azophenylaniline | 1.14 | 56 |
| 18 | N-ethyl-N-methyl-3-hydroxy-4-azophenylaniline | .98 | 47 |
| 19 | 2-azotolyl-4-azophenylnaphthylamine | .99 | 44 |
| 20 | N-[5-[(Diethylamino)sulfonyl]-2-methoxyphenyl]-4-[3-[(diethylamino)sulfonyl]phenylazo]-3-hydroxy-2-naphthamide | 1.32 | 41 |
| 21 | 4-nitro-4'-(p-hydroxyphenylazo)azobenzene | 1.42 | 40 |
| 22 | N-ethyl-4-(o-tolylazo)toluidine | 1.02 | 40 |
| 23 | 1-phenylazo-2-naphthol | 1.18 | 36 |
| 24 | N,N-dimethyl-4-phenylazoaniline | 1.31 | 31 |
| 25 | 4,4'-dihydroxyazobenzene | .69 | 22 |
| 26 | 4,4'-dihydroxyazoxybenzene | .77 | 21 |
| 27 | Azoxybenzene | .76 | 18 |
| 28 | p-Phenylazophenol | .69 | 26 |
| 29 | 2-(p-Acetamidophenylazo)-p-cresol | .83 | 25 |
| 30 | 2,4-bisphenylazophenol | .68 | 22 |

As shown in Table I, additvies in compositions No. 2 to 8 increase the optical density change on irradiation while either reducing or not affecting the percent recovery in dim light. Additives in compositions No. 9 to 13 have the effect of slightly reducing the optical density change while increasing the rate of recovery. Additives in compositions No. 17 to 24 both increase the optical density change and the percent recovery.

EXAMPLE 2

Plasticized cellulose acetate butyrate phototropic compositions are prepared employing the procedure of Example 1 with varying concentrations of the phototrope of Example 1 and 0.1 part of the additive shown in Table II.

TABLE II

| Composition No. | Additive | Concentration of phototrope, Phr.[1] | Optical density change on irradiation for 3 min. in sunlight | Percent recovery in 3 min. in dim incandescent light |
|---|---|---|---|---|
| 1 | None | .03 | .87 | 37 |
| 2 | do | .05 | .83 | 26 |
| 3 | 4-(m-Nitrophenylazo) resorcinol | .03 | .26 | 54 |
| 4 | 4,4'-azobisaniline | .03 | .53 | 45 |
| 5 | N-p-Methoxybenzylidene-p-phenyl-azoaniline | .03 | .27 | 41 |
| 6 | p-[[4-[2-[(Diethylamino)ethyl]amino]-1-naphthyl]azosulfonamide | .03 | .83 | 41 |
| 7 | 5-[[4-[2-[(Diethylamino)ethyl]amino]-1-naphthyl]azo]-N-ethyl-2-methyl-N-phenylbenzenesulfonamide hydrochloride | .03 | .79 | 40 |
| 8 | 4-(m-Nitrophenylazo) resorcinol | .05 | .32 | 37 |
| 9 | 4,4'-azobisaniline | .05 | .44 | 40 |
| 10 | p-[[4-[2-[(Diethylamino)ethyl]amino]-1-naphthyl]-N-(2-pyridyl)benzene-sulfonamide | .05 | .84 | 39 |

[1] Phr.=part per 100 parts of plasticized resin.

Table II illustrates the effects to be achieved by varying the ratio of phototrope to azo compound. Comparing compound No. 8 of Table I with compounds No. 9 and 4 of Table II where the ratio of phototrope to azo compound is 3:1, 0.5:1, and 0.3:1, respectively, the optical density change is found to vary from 1.15 to .32 to .53. Within the range of azo compounds and ratios of azo compounds to phototrope available, almost any desirable activity can be obtained.

EXAMPLE 3

Plasticized cellulose acetate butyrate plates are prepared employing 8-methoxy-5'-methoxycarbonyl-1',3',3'-trimethyl-6-nitrospiro[2H-1-benzopyran-2,2'-indoline] in the concentrations shown in Table III, by the procedure of Example 1. Modifiers which act as stabilizers for the phototrope are added as indicated in Table III. The plates are then exposed continuously outdoors (Kingsport, Tennessee) while mounted at an angle of 36.5° with the horizontal. After three days the plates are stored overnight in the dark and the photoropic composition is again exposed to sunlight and the change in optical density measured. The effectiveness of the stabilizer is shown as the percentage of initial optical density retained after exposure.

TABLE III

| Composition No. | Stabilizer | Stabilizer Concen., phr. | Phototrope Concen., phr. | Percent initial optical density change retained after 3 days continuous exposure |
|---|---|---|---|---|
| 1 | None | 0 | .3 | 25 |
| 2 | 2,6-dimethyl-4H-pyran-Δ⁴,ᵅmalonitrile | .3 | .3 | 33 |
| 3 | 1-benzoyl-2-salicylidenehydrazine | 1.8 | .3 | 29 |
| 4 | Carbon black | .007 | .3 | 28 |
| 5 | Gallium | .01 | .3 | 42 |
| 6 | Azoxybenzene | .1 | .3 | 34 |
| 7 | Azobenzene | .1 | .3 | 51 |
| 8 | Bis(4,4'-dicyanoazobenzene) | .1 | .3 | 48 |
| 9 | 4,4'-dihydroxyazoxybenzene | .1 | .3 | 28 |
| 10 | o-Phenylazophenol | .1 | .3 | 30 |
| 11 | Diethyl-p,p'-azodibenzoate | .1 | .3 | 27 |
| 12 | 5-anilino-2-[4-methoxy-2-benzothiazolyl)azo]phenol | .1 | .3 | 75 |
| 13 | None | | .03 | 2 |
| 14 | 4-(m-Nitrophenylazo)resorcinol | .1 | .03 | 76 |
| 15 | Benzeneazodiphenylamine | .1 | .03 | 25 |
| 16 | 4-(p-Nitrophenylazo)oricinol | .1 | .03 | 15 |
| 17 | N-p-Methoxybenzylidene-p-phenylazoaniline | .1 | .03 | 18 |
| 18 | 2-methoxy-4-(o-methoxyphenylazo)-aniline | .1 | .03 | 87 |
| 19 | 4,4'-azobis(N,N-dimethylaniline) | .1 | .03 | 22 |
| 20 | 4-(p-Nitrophenylazo)resorcinol | .1 | .03 | 18 |
| 21 | 5-(p-Hydroxyphenylazo)-2-chlorobenzene-sulfamide | .1 | .03 | 20 |
| 22 | p-[[4-[[2-(Diethylamino)ethyl]amino]-1-naphthyl]azo]-N-(2-pyridyl)benzenesulfonamide | .1 | .03 | 13 |
| 23 | p-[[4-[[2-(Diethylamino)ethyl]amino]-1-naphthyl]azosulfonamide | .1 | .03 | 19 |
| 24 | 5-[[4-[2-(Diethylamino)ethyl]amino]-1-naphthyl]azo]-N-ethyl-2-methyl-N-phenylbenzene-sulfonamide hydrochloride | .1 | .03 | 5 |
| 25 | 1,3,6,8-tetranitrocarbazole | .1 | .03 | 14 |
| 26 | None | 0 | .05 | 22 |
| 27 | 2-methoxy-4-(o-methoxyphenylazo)-aniline | .1 | .05 | 17 |
| 28 | 4-(m-Nitrophenylazo)resorcinol | .1 | .05 | 58 |
| 29 | 4,4'-azobis(N,N-dimethylaniline) | .1 | .05 | 24 |
| 30 | 4,4'-azobisaniline | .05 | .05 | 77 |
| 31 | Phenyl salicylate | 1.0 | .05 | 15 |
| 32 | 4-dodecyloxy-2-hydroxybenzophenone | 1.0 | .05 | 26 |
| 33 | Nickel chelate of 4-dodecyloxy-2-hydroxybenzophenone | 1.0 | .05 | 66 |
| 34 | None | | .1 | 21 |
| 35 | 4'-dimethyl stilbazole | .1 | .1 | 35 |
| 36 | Malonic acid, (o-carboxyphenylazo)-diethyl ester | .1 | .1 | 45 |
| 37 | Bis[2-[4-[N-(2-hydroxyethyl)anilino]-2-methoxy-phenylazo-4-nitrophenoxy]nickel | .1 | .1 | 32 |
| 38 | 3-[4-[[6-(Methylsulfonyl)-2-benzothiazolyl]azo]-N-3-oxobutyl anilino]-propionitrile | .1 | .1 | 33 |
| 39 | 5,12-diethyl-5,12-dihydroquinoxalino-[2,3-b]phenazine | .1 | .1 | 31 |
| 40 | Bis[5-hydroxy-2-[(m-nitrophenyl)azo]-phenoxy]nickel | .1 | .1 | 75 |
| 41 | 2,4-diphenyl-7-methoxy-4H-1-benzopyran | .3 | .03 | 8 |
| 42 | N-salicylidene-5-t-Bu salicylhydrazide | 1.64 | .3 | 13 |
| 43 | o-Chlorophenylazo-N,N-dimethylaniline | .1 | .3 | 3 |
| 44 | p-Phenylazo-N,N-dimethylaniline | .1 | .3 | 6 |
| 45 | 1,3,5-trinitrobenzene | .1 | .3 | 15 |

As shown in Table III, the phototrope is relatively unstable and suffers fatigue after three days outdoors. After a brief exposure, the phototropic plastics retain from 2 to 25% of initial phototropic activity. The addition of stabilizers to the system dramatically improves the resistance to fatigue.

three days, measured as described in Example 3, is shown in Table V.

TABLE V

| Composition No.: | Modifier | Effect of Modifier on rate of recovery, percent recovery of phototropic composition in 3 minutes | Stabilization of photochrome against degradation in light, percent initial optical density change retained after exposure |
| --- | --- | --- | --- |
| 1 | None | 28 | 17 |
| 2 | 1 phr. 2-methoxy-4-(o-methoxyphenylazo)aniline | 38 | 17 |
| 3 | 1 phr. phenyl salicylate | 34 | 15 |
| 4 | 1 phr. 2-hydroxy-4-dodecyloxybenzophenone | 40 | 26 |
| 5 | 1 phr. 2-methoxy-4-(o-methoxyphenylazo)aniline plus 1.0 phr. phenyl salicylate. | 40 | 80 |
| 6 | 1 phr. 2-methoxy-4-(o-methoxyphenylazo)aniline plus 1.0 phr. 2-hydroxy-4-dodecyloxybenzophenone. | 40 | 70 |
| 7 | 1 phr. 4,4'-azobis(dimethylaniline) | 44 | 24 |
| 8 | 1 phr. 4,4'-azobis(dimethylaniline) plus 1 phr. phenyl salicylate. | 71 | 43 |
| 9 | 1 phr. 4,4'-azobis(dimethylaniline) plus 1 phr. 2-hydroxy-4-dodecyloxybenzophenone. | 46 | 33 |

As shown in Table V, the combination of phenyl salicylate or 2-hydroxy-4-dodecyloxybenzophenone with the azo compound produces synergistic stabilizaiton action. The combination of the two modifiers improves the stability to the extent that, after three days, 70 to 80% of the initial activity is retained. Similarly, the actions of 4,4'-azobis(dimethylaniline) and phenyl salicylate are synergistic in their effect upon the recovery rate of the phototrope. The addition of phenyl salicylate to the phototrope increases the recovery rate by 6%; the addition of 4,4'-azobis(dimethylaniline) increases the recovery rate by 16%. The combination of the two increases the recovery rate by 43%.

EXAMPLE 4

Phototropic compositions are prepared according to the procedure of Example 1 employing 4-nitro-4'-(p-hydroxyphenylazo)azobenzene as the modifier in a concentration of 0.1 part per 100 parts of the unplasticized resin and phototropes listed in Table IV in the concentrations also listed. It is noted that the optical density change can be increased or decreased as observed with the photochrome modifiers in Table IV.

TABLE IV

| | | Optical density change 3 min. irradiation in sunlight | |
| --- | --- | --- | --- |
| Composition No. | Phototrope | Phototrope alone | Phototrope + modifier |
| 1 | 6,8-dichloro-1',3',3'-trimethyl-5'-nitrospiro[2H-1-benzopyran-2,2'-indoline] | .01 | .02 |
| 2 | 6,8-dichloro-1',3',3'-trimethylspiro[2H-1-benzopyran-2,2'-indoline] | .02 | .02 |
| 3 | 6-methoxy-1',3',3'-trimethyl-5'-nitrospiro[2H-1-benzopyran-2,2'-indoline] | .01 | 0 |
| 4 | 6,8-dibromo-1',3',3'-trimethylspiro[2H-1-benzopyran-2,2'-indoline] | .02 | .01 |
| 5 | 6-methoxy-1',3',3'-trimethyl-8-nitrospiro[2H-1-benzopyran-2,2'-indoline] | .24 | .02 |
| 6 | 7'-methoxy-1',3',3'-trimethyl-6-nitrospiro[2H-1-benzopyran-2,2'-indoline] | −.05 | −.11 |
| 7 | 1',3',3'-trimethyl-5',6'-dinitrospiro[2H-1-benzopyran-2,2'-indoline] | 2.7 | .04 |
| 8 | 6,8-dichloro-7'-methoxy-1',3',3'-trimethylspiro[2H-1-benzopyran-2,2'indoline] | 0 | 0 |
| 9 | 6,8-dichloro-2,3-dihydro-1,3,3-trimethylspiro[1-H-benz[e]indole-2,2'-benzopyran] | .14 | .05 |

EXAMPLE 5

Following the procedure of Example 1, phototropic compositions are prepared employing 0.05 part per 100 parts of unplasticized resin of 8-methoxy-5'-methoxycarbonyl-1',3'3'-trimethyl - 6-nitrospiro[2H-1-benzopyran-2,2'-indoline] and the modifiers in the concentrations shown in Table V. The stabilizing effect of the modifier on photochrome as noted by the percentage of recovery on exposure for three minutes and the percentage of initial optical density change observed after exposure for

EXAMPLE 6

Phototropic plasticized cellulose acetate butyrate compositions are prepared as described in Example 1 employing 0.03 part per 100 parts of unplasticized resin of 8-methoxy-5'-methoxycarbonyl-1',3',3'-trimethyl - 6 - nitrospiro[2H-1-benzopyran-2,2'-indoline] as the phototrope and sufficient amounts of modifier such that a 50 mil plate would have an optical density of 100 at the wave length (λ) of the maximum absorption band of the modifier in the ultraviolet spectrum. The density change before and after continuous exposure for one day, as described in Example 3, is measured. The modifier concentrations thereof and percentage of optical density change retained are set forth in Table VI which shows that the modifiers significantly increase the stability of the phototropic plastics to light.

turned to the dark and allowed to recover. The photochromic activity was again determined in sunlight as described above. The data collected were: optical density change on 3 min. irradiation, the percent recovery (percent R), and the percent of initial optical density change retained after 3 days' exposure. The percent recovery was

TABLE VI

| Composition No. | Modifier | Modifier concen., phr. | Stabilization of photochrome against degradations in light, percent initial optical density change retained after exposure of 1 day |
|---|---|---|---|
| 1 | None | | 17 |
| 2 | p-Hydroxybenzophenone | 1.0 | 12 |
| 3 | 2,4-dihydroxy-3,5-dibenzoylbenzoic acid | 1.0 | 3 |
| 4 | 2,4-dimethoxybenzophenone | 2.4 | 12 |
| 5 | 2-hydroxy-4-dodecyloxybenzophenone | 1.5 | 27 |
| 6 | 5-(p-Dimethylaminobenzylidene)rhodanine | 1.2 | 0 |
| 7 | Phenyl-(2H)-benzotriazole | | 21 |
| 8 | 2-(2-hydroxyphenyl)-5-phenyl-1,3,4,-oxadiazole | 0.9 | 35 |
| 9 | 2-hydroxy-5-nitrobenzophenone | 1.4 | 45 |
| 10 | 2-hydroxy-4,4'-dimethoxy-5-nitrobenzophenone | .9 | 26 |
| 11 | 5-benzylidene-2,4-thiazolidinedione | .6 | 32 |
| 12 | Nickel acetyl acetonate | .76 | 32 |
| 13 | Nickel chelate of 2-hydroxy-4-dodecyloxybenzophenone | 1.6 | 57 |
| 14 | Manganese-p-aminosalicylate [1] | 0.1 | 21 |
| 15 | Manganese salt of 2,4-dihydroxybenzophenone [1] | 0.1 | 36 |

[1] Not added at concentration calculated to give 100 optical density.

EXAMPLE 7

Plasticized phototropic cellulose acetate butyrate plates are prepared as described in Example 1 employing the phototropes and modifiers shown in Table VII. The optical density change on three minute exposure to sunlight and the recovery of the exposed plate is measured and recorded in Table VII which shows that the modifier significantly improved the recovery of the photochrome in plastic media.

defined as 100 times the inverse ratio of optical density change in 3 min. in light to the optical density change in a subsequent 3-min. interval in the dark. The compositions tested and the data recorded are summarized in Table VIII.

As shown in the table a wide variety of effects were found for the additives incorporated with the photochrome. Compositions 2–17 were stabilizers for the photochrome as shown in column 7 of the table. In these cases

TABLE VII

| Phototropic Composition | Photochrome activity of compositions, optical density change on 3 minutes exposure to sunlight | Effect of modifier on rate of recovery of photochrome, percent recovery in 3 minutes |
|---|---|---|
| Number: | | |
| 1 — 0.3 Phr. phototrope A [a] | .59 | 34 |
| 2 — 0.03 Phr. phototrope B [b] | .49 | 12 |
| 3 — 0.3 Phr. phototrope A plus 0.1 phr. 2-(anilino-methylidyne)-4,6-dinitrophenol | .27 | 92 |
| 4 — 0.03 Phr. phototrope B plus 0.5 phr. 2,5-cyclo hexadineΔ¹,α:⁴,α'-dimalonitrile | −.08 | 0 |
| 5 — 0.03 Phr. phototrope B plus .1 phr. 2-(anilino-methylidyne)-4,6-dinitrolphenol | −.16 | 0 |
| 6 — 0.03 Phr. phototrope B plus 1 phr. terephthalonitrile | .31 | 26 |
| 7 — 0.3 Phr. phototrope A plus 1 pt. terephthalonitrile | .68 | 31 |
| 8 — 0.3 Phr. phototrope A plus 1 pt. 2,6-diphenyl-4H-pyran-4-one | .13 | 100 |

[a] Phototrope A=8-methoxy-5'-methoxycarbonyl-1',3',3'-trimethyl-6-nitrospiro [2H-1-benzopyran-2,2'-indoline].
[b] Phototrope B=8-methoxy-1',3',3'-trimethyl-6-nitrospiro [2H-1-benzopyran-2,2'-indoline].

EXAMPLE 8

Cellulose acetate butyrate was compounded on hot rolls with a master batch of the photochrome, 5'-methoxycarbonyl-8-methoxy-1',3',3'-trimethyl - 6 - nitrospiro[2H-1-benzopyran-2,2'-indoline] to be evaluated. Dibutyl sebacate was used as a plasticizer at a concentration level of 12 parts per hundred parts of polymer. The compounding conditions were 270° F. for the front roll and 230° F. for the rear roll. In addition to the photochrome, certain other additives were also included to modify the properties of the photochromic plastic. Flat plates 50-mil thick were compression molded from the roll slabs and specimens cut from these were evaluated for photochromic activity in sunlight. Optical density of the specimens was determined before and after 3 min. irradiation in sunlight. After the initial photochromic properties had been determined the specimens were set outdoors for 3 days, rethe percent inital optical density change retained after 3-days' exposure is higher than that found for the photochrome alone. Compositions 18–25 all have a higher rate of recovery than the composition containing the photochrome alone, indicating that these additives have improved this property of the photochrome. Compositions 26–29 have a higher optical density change on initial irradiation than the control (composition 1) without additives. These compositions demonstrate the control or improvement in the photochromic activity of the composition. The remaining compounds have little if any effect on the photochromic activity of the compositions. An increase in the initial optical density change of the composition was not found, neither was any improvement in the rate of recovery or in the stability of the composition. These additives are similar in structure to the ones which produced the desirable effects and indicate the unexpectedness of the invention.

TABLE VIII

| Composition No.: | Photo-chrome concn., phr. | Additive concn., phr. | Additive | Optical density change on 3 minutes irradiation in sunlight | Percent R 3 minutes in dark | Percent initial optical density change retained after 3 days exposure |
|---|---|---|---|---|---|---|
| 1 | 0.1 | | None | .65 | 32 | 29 |
| 2 | 0.1 | 0.1 | 2-(p-Dimethylaminohpenylazo)pyridine | .93 | 37 | 90 |
| 3 | 0.1 | 0.1 | 5-dimethylaminoethylidene-3,4-di-(p-nitrophenyl (5H) furanone | .58 | 8 | 76 |
| 4 | 0.1 | 0.1 | Triphenyl formazan | .62 | 33 | 45 |
| 5 | 0.1 | 0.1 | Methyl-3-[N-(2-cyanoethyl)-4-[[6-methylsulfonyl)-2-benzothiazoyl]azo]anilino]-propionate. | .97 | 38 | 45 |
| 6 | 0.1 | 1.0 | Nickel chelate of N-salicylideneaniline | .12 | 25 | 41 |
| 7 | 0.1 | 0.1 | 5'-(Di-tert-butylamino)-4'-methoxy-2'-[[3-nitro-5-m-nitrobenzoyl)-2-thienyl]-azo]acetanilide. | .44 | 32 | 39 |
| 8 | 0.1 | 0.1 | Nickel-N-butylamine chelate of 2,2'-thiobis(p-octylphenol) | .61 | 33 | 39 |
| 9 | 0.1 | 0.1 | 1,2,3,4-tetrahydro-2,4,6-triphenyl-5-tetrazine | .58 | 31 | 34 |
| 10 | 0.1 | 0.1 | 4-[4-(Dimethylamino)styryl]-pyridine | .31 | 45 | 35 |
| 11 | 0.1 | 0.1 | 2'-[5-acetyl-2-thiazolo)azo]-5'-(β-hydroxyethylamino)-4'-methoxy-acetanilide. | .45 | 27 | 38 |
| 12 | 0.1 | 0.3 | N-salicylidene-o-aminobenzonitrile | .46 | 29 | 35 |
| 13 | 0.1 | 0.1 | 2'-[(5-acetyl-3-nitro-2-thienyl)azo]-5'-(di-tert-butylamino)-4'-methoxyacetanilide. | .32 | 31 | 34 |
| 14 | 0.1 | 1.0 | 4,4'-didodecyloxy-2,2'-dihydroxybenzophenone | .43 | 25 | 33 |
| 15 | 0.1 | 1.0 | Nickel dodecyl acetoacetate | .65 | 28 | 32 |
| 16 | 0.1 | 1.0 | 3-hexadecyl-5-(o-hydroxy-benzylidene)-2-phenylimino-4-thiazolidinone. | .28 | 32 | 32 |
| 17 | 0.1 | 0.1 | 2-bromo-4'-phenylazo-acetophenone | .68 | 40 | 31 |
| 18 | 0.1 | 0.1 | 4-(o-Tolylazo)-o-toluidine | .51 | 49 | 10 |
| 19 | 0.1 | 0.1 | 4-(p-phenylazophenyl)semicarbazide | .52 | 46 | 19 |
| 20 | 0.1 | 0.1 | 4-[[2-hydroxy-5-nitrophenyl)-imino]methyl]resorcinol | .45 | 45 | 15 |
| 21 | 0.1 | 0.5 | Cholesterylcinnamylcarbonate | .81 | 44 | 4 |
| 22 | 0.1 | 0.1 | N,N'-disalicylidene-p,p'-phenylenediamine | .33 | 44 | 18 |
| 23 | 0.1 | 0.1 | N-salicylidene-2,4-dinitroaniline | .34 | 41 | 14 |
| 24 | 0.1 | 0.1 | N,N-dimethyl-p-(m-talylazo)-aniline | .76 | 41 | 16 |
| 25 | 0.1 | 0.1 | N,N-dimethyl-p-i-naphthyl-azoaniline | .88 | 37 | 20 |
| 26 | 0.1 | 0.1 | 1-(2-pyridylazo)-2-naphthol | 1.31 | 31 | 29 |
| 27 | 0.1 | 0.1 | 3-[p-Anilinophenyl)azo]-4-hydroxybenzenesulfonamide | 1.28 | 32 | 14 |
| 28 | 0.1 | 0.1 | m-[(p-Anilinophenyl)azo]-benzenesulfonamide | 1.09 | 32 | 14 |
| 29 | 0.1 | 0.1 | 4-phenylazo-1-naphthylamine | .92 | 20 | 20 |
| 30 | 0.1 | 0.1 | 1-[[p-(Diethylamino)phenyl]-azo]-3-naphthyl-1-pyridylketone | .72 | 35 | 18 |
| 31 | 0.1 | 0.1 | 4'-hydroxy-4-(phenylazo)-benzenesulfonanilide | .67 | 37 | 16 |
| 32 | 0.1 | 0.1 | Ni chelate of 3-dodecyl-2-hydroxy-5-methyl lamophenone oxime | .61 | 27 | 23 |
| 33 | 0.1 | 0.1 | 2'-[(5-benzoyl-3-nitro-2-thienyl)azo]-5'-[bis(2-hydroxyethyl)amino]4'-methoxyacetanilide. | .48 | 35 | 18 |
| 34 | 0.1 | 0.1 | Ni complex with phenylazo resorcinol | .77 | 30 | 23 |
| 35 | 0.1 | 0.1 | 4-hydroxy-3-[(2-hydroxy-4,5-dimethylphenyl)azo]-benzenesulfonamide. | .66 | 33 | 16 |

Control of Photochromic Activity of 5'-methoxycarbonyl-8-methoxy-1',3',3'-trimethyl-6-nitrospiro [2H-1-benzopyran-2,2'-inodoline].

EXAMPLE 9

Cellulose acetate butyrate was compounded as in Example 8 with the photochrome, 8-methoxy-1',3',3'-trimethyl - 5',6 - dinitrospiro[2H - 1 - benzopyran-2,2'-indoline], and with the additives to be tested as stabilizers or photochromic activity modifiers. The tests were conducted outdoors in Kingsport in the same manner as that described in Example 8. The results are summarized in Table IX. This photochrome has an inherently higher rate of recovery than the photochrome of Example 8. Some of the same additives found to be effective in controlling the photochromic activity of the former photochrome are also effective with this photochrome. In the case of compositions 2, 3, and 16 exceptional stability was obtained. In other cases exceptional recovery was found. For the most part only minor increases in the initial optical density change were obtained. This example is significant in that it describes compositions which have very high rates of recovery and satisfactory stability.

TABLE IX.—CONTROLLED PHOTOCHROMIC ACTIVITY OF 8-METHOXY-1',3',3'-TRIMETHYL-5',6-DINITROSPIRO-[2H-1-BENZOPYRAN-2,2'-INDOLINE]

| Composition No.: | Photo-chrome Concn., phr. | Additive Concn., phr. | Additive | Optical density change on 3 minute irradiation in sunlight | Percent R 3 minutes in dark | Percent initial optical density change retained after 3 days' exposure |
|---|---|---|---|---|---|---|
| 1 | 0.1 | | None | .41 | 59 | 12 |
| 2 | 0.1 | 1.0 | Nickel complex with 4-(m-nitrophenylazo) resorcinol | .34 | 29 | 105 |
| 3 | 0.1 | 0.1 | p-Phenylazo-N,N-dimethylaniline | .25 | 76 | 64 |
| 4 | 0.1 | 0.05 | 2'-[(5-acetyl-3-nitro-2-thienyl)azo]-5'-(di-tert-butylamino)-4'-methoxyacetanilide. | .20 | 60 | 35 |
| 5 | 0.1 | 0.05 | 5'-(Di-tert-butylamino)-4-methoxy-2'-[[(3-nitro-5-(m-nitro-benzoyl)-2-thienyl]-azo]acetanilide. | .15 | 86 | 20 |
| 6 | 0.1 | 0.1 | 4,4'-azodianiline | .22 | 73 | 14 |
| 7 | 0.1 | 0.1 | 4,4'-azobis(N,N-dimethylaniline) | .35 | 71 | 8 |
| 8 | 0.1 | 0.1 | p-Nitrophenylazophenol | .20 | 70 | 5 |
| 9 | 0.1 | 0.1 | 2,4-bis(phenylazo)-1-naphthylamine | .32 | 69 | 0 |
| 10 | 0.1 | 0.1 | 1-(Phenylazo-2-naphthol) | .38 | 68 | 0 |
| 11 | 0.1 | 0.1 | 4-(p-Nitrophenylazo) resorcinol | .22 | 68 | 4 |
| 12 | 0.1 | 0.1 | 4-(m-Nitrophenylazo) resorcinol | .16 | 68 | 0 |
| 13 | 0.1 | 0.1 | Azobenzene | .27 | 63 | 7 |
| 14 | 0.1 | 0.1 | 2-[N-Ethyl-p-[(p-nitrophenyl)azo]anilino]-ethanol | .46 | 63 | 11 |
| 15 | 0.2 | | None | .45 | 75 | 22 |
| 16 | 0.2 | 0.2 | Cholesterylcinnamyl carbonate | .48 | 83 | 60 |
| 17 | 0.2 | 0.2 | Nickel complex (m-nitrophenylazo) resorcinol | .29 | 90 | 31 |
| 18 | 0.2 | 0.2 | Dithizone | .22 | 100 | 14 |
| 19 | 0.2 | 0.2 | 1-(2-pyridylazo)-2-naphthol | .45 | 86 | 9 |
| 20 | 0.2 | 0.001 | Gallium | .39 | 84 | 8 |
| 21 | 0.2 | 0.2 | 2-(Dimethylaminophenylazo)phridine | .48 | 81 | 6 |
| 22 | 0.2 | 1.0 | Cyasorb 1084 | .47 | 81 | 8 |

EXAMPLE 10

Cellulose acetate butyrate was compounded with the photochrome, 8-methoxy-1′,3′,3′-trimethyl-5′,6 - dinitrospiro [2H-1-benzopyran-2,2′-indoline], and additives in the same manner as that described above. Plates were molded and the composition was tested in the same manner as that described above. The compositions tested and the results of the tests are summarized in Table X. As seen from the Table 9 of the compositions, numbers 8 and 9, were synergistic in stabilization against ultraviolet degradation of the photochrome. None of the additives were effective in preventing degradation of the photochrome when incorporated singly. However, when the azo compound 2-(p-dimethylamino-phenyl-azo)phridine was mixed with either carbon black or gallium significant improvements in stability were obtained. As shown in the case of compositions 5, 6, and 7 a different but related azo compound was neither effective nor synergistic in stabilizing effects. It thus appears that compositions 8 and 9 are unique.

summarized in Table XI. As seen in the table, all the compositions retained a higher percentage of their initial optical density change after exposure than composition 1, the unstabilized composition. Compositions 3, 6, and 7 are outstanding in stability.

TABLE XI

| Composition No. | Photochrome concn., Phr.[1] | Additives | Optical density change on 3 minutes irradiation in sunlight | Percent R[2] | Percent initial optical density change retained after 3 days' exposure |
|---|---|---|---|---|---|
| 1 | .1 | None | .80 | 29 | 35 |
| 2 | .1 | Plus 1pt.Salo[3] | .77 | 26 | 38 |
| 3 | .1 | Plus 1 pt. Salol plus .001 pt. Ni complex with p-(6-hydroxy-3-nitrophenylazo)-N-phenyl-N-β-hydroxyethyl-m-anisidine. | .62 | 27 | 67 |
| 4 | .1 | Plus 1pt. Salol plus.001pt.methyl-3-[N-(2-cyanoethyl)-4-[[6-methylsulfonyl)-2-benzothiazolyl]azo]-anilino]propionate. | .87 | 29 | 40 |
| 5 | .1 | Plus 2 pt. 2-hydroxy-4-dodecyloxybenzophenone plus .01 pt.1,4-diamino-2-nitroanthraquinone. | .43 | 36 | 47 |
| 6 | .1 | Plus 2pt. Salol plus .001 pt. 4-(5′-nitro-2′-thiazolylazo)-3-methyl-N-ethyl-N-β-γ-dihydroxypropylaniline. | .56 | 39 | 61 |
| 7 | .1 | Plus 1 pt. Salol plus .05 2′-[(5-acetyl-3-nitro-2-thienyl)azo]-5′-(di-tert-butylamino)-4′-methoxyacetanilide. | .50 | 42 | 100 |
| 8 | .1 | Plus 1 pt. Salol plus .1 pt. 2-bromo-4′-phenylazoacetophenone. | .73 | 36 | 43 |

[1] 5′-methoxycarbonyl-8-methoxy-1′,3′,3′-trimethyl-6-nitrospiro[2H-1-benzopyran-2,2′-indoline].

[2] $100 \times \frac{\text{Optical Density in 3 Min. Change in Darkness}}{\text{Optical Density in 3 Min. Change in Sunlight}}$

[3] Phenyl salicylate.

EXAMPLE 12

Cellulose acetate butyrate was hot roll compounded with a portion of a master batch of the photochrome, 5′-methoxycarbonyl - 8 - methoxy-1′,3′,3′-trimethyl-6-nitrospiro[2H-1-benzopyran-2,2′ - indoline] on hot rolls. To this mixture were added the control additives to be tested. The roll slab was pressed into a flat plate 50-mil thick. Photochromic measurements were made on these plates. The source of activating radiation was in this case a 1500 watt Xenon Arc Fade-Ometer. Specimens cut from the plates were evaluated for photochromic activity by irradiating for 3 min. and measuring the increase in optical density of the 50-mil thick section. The specimens were then stored in dim light for a period up to 3 min.

TABLE X.—SYNERGISM IN PHOTOCHROMIC STABILITY

| Composition No. | Photochrome concn, Phr.[1] | Additives | Initial optical density | Optical density change on 3 minutes irradiation in sunlight | Percent R[2] | Percent initial optical density change retained after 3 days' exposure |
|---|---|---|---|---|---|---|
| 1 | 0.2 | | .07 | .45 | 75 | 22 |
| 2 | 0.2 | Plus .001 pt. Witco 100 | .25 | .47 | 76 | 12 |
| 3 | 0.2 | Plus .001 pt. Ga | .25 | .39 | 84 | 8 |
| 4 | 0.2 | Plus 2 pt. 2-(p-dimethylaminophenylazo)pyridine | .64 | .48 | 81 | 6 |
| 5 | 0.2 | Plus 2 pt. 1-(2-pyridylazo)-2-naphthol | .50 | .45 | 86 | 9 |
| 6 | 0.2 | Plus 2 pt. 1-(2-pyridylazo)-2-naphthol plus .001 pt. Witco 100 | .65 | .48 | 85 | 2 |
| 7 | 0.2 | Plus 2 pt. 2-(2-pyridylazo)-2-naphthol plus .001 pt. Ga | .56 | .47 | 78 | 14 |
| 8 | 0.2 | Plus 2 pt. 2-(p-dimethylaminophenyalzo)pryidine plus .001 pt. Witco 100. | .70 | .42 | 86 | 67 |
| 9 | 0.2 | Plus 2 pt. 2-(p-dimethylaminophenylazo)pyridine plus .001 pt. Ga | .71 | .46 | 84 | 52 |

[1] 8-methoxy-1′,3′,3′-trimethyl-5′,6-dinitrospiro[2H-1-benzopyran-2,2′-indoline].

[2] $100 \times \frac{\text{Optical Density Change During 3 min. in Dark}}{\text{Optical Density Change During 3 Min. in Sunlight}}$

EXAMPLE 11

Cellulose acetate butyrate compositions were made up as in Example 8. The photochrome, 5′-methoxycarbonyl-8 - methoxy - 1′,3′,3′ - trimethyl - 6 - nitrospiro[2H - 1 - benzopyran-2,2′-indoline], was blended into the plastic alone and in addition with other stabilizing additives. Stability tests were conducted outdoors in Kingsport, Tennessee, in the same manner as that described above. The results of the tests and the compositions tested are and the change in optical density with time determined. The inverse ratio of the optical density change in the first 3 min. of irradiation to that in the subsequent 3 min. in subdued light was defined as the percent recovery (percent R). The specimens were then exposed continuously for 16 hr. in the Fade-Ometer and then stored for 24 hr. in darkness, after which the photochromic activity was again measured as indicated above. The percent optical density change retained after 16-hours' exposure was taken as a measure of ultraviolet stability. The compositions tested and the results of the test are summarized in Table XII.

As shown in the table, all of the additives increased the rate of recovery of the plastic in subdued light. The majority of the azo compounds improved the ultraviolet stability of the composition. Compositions 3, 5, 11, 18, and 21 are outstanding in this respect. However, compositions 9, 14, 19, and 20 showed no improvement in stability.

posure the specimens were allowed to stand in the dark for 24 hr. After this period in the darkness, the compositions were exposed to sunlight for 3 min. and the optical density change, in 3 min., determined for both sections of the specimen. The rate of recovery was also determined for each section of the specimen. The comparison of the photochromic activity of the exposed section with that of the unexposed section indicated the degree of ultraviolet stability of the composition. The compositions tested and the results of the tests are summarized in Table XIII.

TABLE XII.—EFFECT OF VARIOUS AZO DYES ON THE PHOTOCHROMIC ACTIVITY OF 5'-METHOXYCARBONYL-8-METHOXY-1',3',3'-TRIMETHYL-6-NITROSPIRO[2H-1-BENZYPYRAN-2,2'-INDOLINE][1]

| Composition No. | Azo Dye at 0.1 Phr. Concentration | Initial optical density change 3 minutes | Percent R 3 minutes [2] | Percent initial optical density change retained after 16 hours' exposure |
|---|---|---|---|---|
| 1 | None | .60 | 22 | 10 |
| 2 | 4-(4'-aminophenylazo)-N,N-dimethylaniline | .36 | 42 | 14 |
| 3 | 4-(4'-aminophenylazo)-N,N-di-$\beta$-hydroxyethylaniline | .47 | 32 | 34 |
| 4 | 4-(4'-methylphenylazo)-2,5-dimethoxyaniline | .52 | 37 | 22 |
| 5 | 4-(4'-nitro-2',6-dichlorophenylazo)-N,N-di-$\beta$-hydroxyethylaniline | .67 | 31 | 32 |
| 6 | 4-(4'-nitrophenylazo)aniline | .69 | 35 | 22 |
| 7 | 4-(6'-methylsulfonyl-2'-benzothiazolylazo)-3-methyl-N-ethyl-N-$\beta$-cyanoethylaniline | .73 | 30 | 19 |
| 8 | 4-[4'-(Phenylazo)phenylazo]phenol | .22 | 36 | 23 |
| 9 | 4-(5'-nitro-2'-thiazolylazo)-2-methoxy-5-N-acetylamino-N-$\beta$-dihydroxypropylaniline | .22 | 27 | 13 |
| 10 | 4-(5'-nitro-2'-thiazolylazo)-3-methyl-N-ethyl-N-$\beta$-dihyrdoxypropylaniline | .56 | 32 | 16 |
| 11 | 4-(3,3-dimethyltriazeno)-4'-N,N-di-$\beta$-hydroxyethylaminoazobenzene | .42 | 45 | 31 |
| 12 | 4(4'-nitro-2',6'-dichlorophenylazo)-3-methyl-N-$\beta$-cyanoethyl-N-ethylaniline | .65 | 46 | 17 |
| 13 | 4-(2',6'-dichloro-4'-nitrophenylazo)-N-$\beta$-succinimidoethyl-m-toluidine | .85 | 28 | 21 |
| 14 | 4-(4'-nitrophenylazo)-2-chloro-N-$\beta$-hydroxyethylaniline | .68 | 46 | 24 |
| 15 | 4-(4'-nitrophenylazo)-2-methyl-N-$\beta$-hydroxyethylaniline | .93 | 48 | 25 |
| 16 | 4-(4'-nitrophenylazo)-N-ethyl-N-$\beta$-cyanoethylaniline | .71 | 38 | 17 |
| 17 | 4-(4'-nitrophenylazo)-N-$\beta$-succinimidoethyl-N-$\beta$-cyanoethyl-m-toluidine | .80 | 45 | 20 |
| 18 | 4-(2',6'-dichloro-4'-nitrophenylazo)-N-$\beta$-cyanoethyl-N-$\beta$-ethylaniline | .56 | 48 | 30 |
| 19 | 2-(4'-acetylaminophenylazo)-4-methylphenol | .26 | 38 | 11 |
| 20 | 2-(4'-chloro-2'-nitrophenylazo)-5,5-dimethyl-1,3-cyclohexanedione | .29 | 41 | 10 |
| 21 | 4-(2',6'-dichlorophenylazo)-N,N-dicyanoethylaniline | .42 | 43 | 69 |

[1] At 0.05 phr. concentration.

[2] Percent R = $\dfrac{\text{Optical Density Change on Standing 3 Min. in Subdued Light}}{\text{Optical Density Change on 3 Min. Irradiation in Xenon Arc}} \times 100$.

EXAMPLE 13

Cellulose acetate butyrate was compounded with 9 parts dibutyl sebacate and a portion of a master batch of the photochrome to be evaluated. Also compounded with the mixture were several azo dyes shown in the early examples to be stabilizers for the photochrome. These dyes were compounded with the photochrome and with ultraviolet stabilizers for cellulose acetate butyrate. The photochromic activity of the compositions were measured in sunlight in Kingsport, Tennessee. The stability and activity were evaluated by exposing the plastic specimens outdoors for 3 days while a portion of the specimen was covered with opaque tape. After the ex- This example illustrates the extent that colorants and stabilizers may be added to the photochromic composition and thus control the photochromic activity of the system. As shown in previous examples azo dyes often increase the stability of the plastic and also speed the rate of recovery. In this case the addition of an ultraviolet stabilizer also increases the rate of recovery, alters the degree of optical density change on irradiation, and in some cases improves the resistance to fatigue. The proper combination of these additives will produce a variety of stable photochromic plastics having the desired photochromic activity.

TABLE XIII.—LIGHT STABLE PHOTOCHROMIC COMPOSITIONS BASED ON 5'-METHOXYCARBONYL-8-METHOXY-1',3',3'-TRIMETHYL-6-NITROSPIRO[2H-1-BENZOPYRAN-2,2'-INDOLINE]

| Photochrome concen., Phr. | Salol concen., Phr.[2] | RMB concen., Phr.[3] | DOBP concen., Phr.[4] | Azo Dye at Designated Concentration | Optical density change | Percent R | Percent initial change retained |
|---|---|---|---|---|---|---|---|
| 0.1 | | | | .1 pt. 4-(4'-aminophenylazo)-N,N-di-$\beta$-hydroxy ethylaniline | .56 | 36 | 14 |
| 0.1 | 1.0 | | | do | .57 | 44 | 14 |
| 0.1 | | 1.0 | | do | .39 | 33 | 0 |
| 0.1 | | | 0.5 | do | .36 | 44 | 5 |
| 0.1 | | | | .1 pt. 4-(4'-nitrophenylazo) aniline | .83 | 35 | 10 |
| 0.1 | 1.0 | | | do | .64 | 31 | 9 |
| 0.1 | | 1.0 | | do | .85 | 41 | 6 |
| 0.1 | | | 0.5 | do | .46 | 43 | 0 |
| 0.1 | | | | .1 phr. 4(3,3-dimethyltriazeno)-4;N,N-di-$\beta$-hydroxyethylaminoazobenzene | .68 | 35 | 16 |
| 0.1 | 1.0 | | | do | .62 | 31 | 18 |
| 0.1 | | 1.0 | | do | .85 | 39 | 16 |
| 0.1 | | | .05 | do | .45 | 44 | 16 |
| 0.1 | | | | .1 phr. 4-(4'-nitrophenylazo)-2-chloro-N-$\beta$-hydroxyethylaniline | .79 | 40 | 15 |
| 0.1 | 1.0 | | | do | .76 | 38 | 13 |
| 0.1 | | 1.0 | | do | .76 | 37 | 11 |
| 0.1 | | | 0.5 | do | .47 | 38 | 8 |
| 0.1 | | | | .02 phr. of a black dye [1] | .62 | 19 | 16 |
| 0.1 | 1.0 | | | do | .59 | 29 | 18 |
| 0.1 | | 1.0 | | do | .68 | 26 | 13 |
| 0.1 | | | 0.5 | do | .47 | 42 | 15 |
| 0.3 | | | | .3 phr. azobenzene | .68 | 38 | 24 |
| 0.3 | 1.0 | | | do | .71 | 31 | 28 |

TABLE XIII.—LIGHT STABLE PHOTOCHROMIC COMPOSITIONS BASED ON 5'-METHOXYCARBONYL-8-METHOXY-1',3',3'-TRIMETHYL-6-NITROSPIRO[2H-1-BENZOPYRAN-2,2'-INDOLINE] —Continued

| Photochrome concen., Phr. | Salol concen., Phr.[2] | RMB concen., Phr.[3] | DOBP concen., Phr.[4] | Azo Dye at Designated Concentration | Optical density change | Percent R | Percent initial change retained |
|---|---|---|---|---|---|---|---|
| 0.3 | | 1.0 | | do | .75 | 24 | 33 |
| 0.3 | | | 0.5 | do | .72 | 36 | 28 |
| 0.3 | | | | .2 phr. p-Phenylazo-phenol | .60 | 41 | 20 |
| 0.3 | 1.0 | | | do | .58 | 38 | 20 |
| 0.3 | | 1.0 | | do | .61 | 39 | 25 |
| 0.3 | | | 0.5 | do | .54 | 38 | 26 |

[1] Black Dye is a blend of:
  1-hydroxy-4-p-anisidinoanthraquinone.
  4-(4'-β-hydroxyethylanilino)-5-nitro-1.8-dihydroxyanthraquinone.
  Bromodiaminoanthraquinone.
  4-anilino-5-nitro-1.8-dihydroxyanthraquinone.
  4-(4'-nitrophenylazo)-N-ethyl-N-β-cyanoethylaniline.
[2] Phenyl salicylate.
[3] Resorcinol monobenzoate.
[4] 4-dodecyloxy-2-hydroxybenzophenone.

EXAMPLE 14

Cellulose acetate butyrate was compounded with 9 parts of dibutyl sebacate, the photochrome (5'-methoxycarbonyl - 8 - methoxy - 1',3',3' - trimethyl - 6 - nitrospiro [2H-1-benzopyran-2,2'-indoline]) and the control additives to be evaluated. The method of compounding was that described in the previous examples. Flat plates, 50-mil thick, were compression molded. Specimens cut from these plates were evaluated for photochromic activity using a 1500 watt Xenon Arc as the light source. Evaluations were made before and after 16-hours' exposure in an Atlas Xenon Arc Fade-Ometer. The stability of the composition was recorded as the percent of initial optical density change (for a 3-min, period of irradiation) retained after the 16 hr. of exposure in the Fade-Ometer. The compositions tested and the results are summarized in Table XIV.

As shown in the table the addition of the azo dye to the system containing the photochrome and Tinuvin P restricted the initial optical density change to approximately half that of the composition with Tinuvin P alone. These azo additives also greatly improved the ultraviolet stability of the system. Composition 2, for example, retained 91% of its initial optical density change after exposure in the Fade-Ometer whereas the composition containing Tinuvin P alone retained only 13% of its initial optical density change.

This example further demonstrates a method of controlling the photochromic activity of the composition. The initial optical density change can be reduced and the stability or resistance to fatigue greatly increased.

As seen in Table VII, the additive 2-(anilinomethylidyne)-4,6-dinitrophenol is a very active accelerator of the rate of return or fading of 8-methoxy-5'-methoxycarbonyl - 1',3',3' - trimethyl - 6-nitrospiro[2H-1-benzopyran-2,2'-indoline], increasing the rate of recovery from 34% to 92%. On the other hand, addition of this phenol to the phototrope not substituted in the 5'-position reverses the phototropic activity and causes the composition to fade on exposure to sunlight instead of coloring. The phototropic plastics in the former case are useful in sunglasses, for example, while in the latter case are useful in photographic applications.

Also shown in Table VII is the contrast between the mixture of terephtalonitrile with the 5'-substituted phototrope and the phototrope not substituted in the 5'-position. In this case, the unsubstituted phototrope is increased in percent recovery while the substituted one is slightly increased in the optical density change on exposure.

The most active accelerator of the fading rate is 2,6-diphenyl-4H-pyran-4-one which reduces the optical density change and increases the rate of fading to 100% in 3 minutes. The use of these additives in combination with the phototrope greatly enhances the phototropic activity and establishes a degree of control heretofore unknown.

The foregoing examples have illustrated the ability of the modifiers of the present invention to alter the phototropic properties of spirobenzopyranindolines in a number of ways to suit a particular application of the phototropic composition. The phototropic compositions can be similarly altered when spirobenzopyranindolines within the scope of the present invention but not specifically illustrated in the examples are employed. The phototropic properties of the spirobenzopyranindolines can similarly be altered when such are dispersed in other thermoplastic resin media such as stated hereinabove, as well as the organic solvents described.

TABLE XIV.—ULTRAVIOLET STABILITY OF CELLULOSE ACETATE BUTYRATE COMPOSITIONS CONTAINING 5'-METHOXYCARBONYL-8-METHOXY-1',3',3'-TRIMETHYL-6-NITROSPIRO[2H-1-BENZOPYRAN-2,2'-INDOLINE]

| | Azo Additive [2] to Tinuvin P [3] | Initial optical change, 3 minutes | Percent R in 3 minutes | Percent initial optical density change retained after 16 hours' exposure [1] |
|---|---|---|---|---|
| Composition No.: | | | | |
| 1 | None | .32 | 34 | 13 |
| 2 | 4-(4'-aminophenylazo)-N,N-dimethylaniline | .08 | 25 | 91 |
| 3 | 4-(4'-aminophenylazo)-N,N-di-β-hydroxyethylaniline | .12 | 50 | 55 |
| 4 | 4-(4'-methylphenylazo)-2,5-dimethoxyaniline | .15 | 40 | 35 |
| 5 | 4-(4'-nitrophenylazo)aniline | .16 | 40 | 31 |
| 6 | 4-[4'-(phenylazo)phenylazo]phenol | .10 | 40 | 30 |
| 7 | 4-(5'-nitro-2'-thiazolylazo)-3-methyl-N-ethyl-N-β-γ-dihydroxypropylaniline | .17 | 35 | 19 |

[1] Xenon Arc Fade-Ometer.
[2] At .1 phr. added to .05 phr. photochrome.
[3] Ultraviolet Stabilizer Mfg. by Geigy Chem.; at a concentration of 1.0 phr.

Although the invention has been described in detail with reference to preferred embodiments thereof, it will be understood that variations and modifications can be effected within the spirit and scope of the invention as described hereinabove and as defined by the appended claims,

I claim:
1. A phototropic composition comprising a 1:100 to 100:1 molar ratio mixture of (A) a phototrope having the general formula

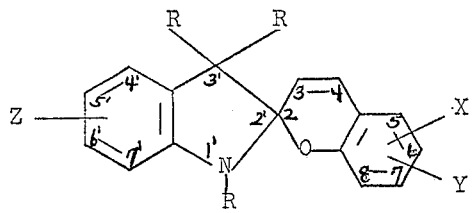

wherein X, Y, and Z are the same or different monovalent radicals selected from the group consisting of hydrogen, carboxyl, alkoxy, nitro, hydroxyl, alkoxycarbonyl, cyano, halogen, amido, alkylsulfone, arylsulfone, acyl and acylamido, in which the hydrocarbyl groups attached to functional moieties containing such have not more than 8 carbon atoms, at least one of said X, Y, Z substituents being other than hydrogen, said substituent Z being located at positions 4' to 7', inclusive, and said substituents X and Y being located at positions 5 to 8, inclusive, and wherein R is a hydrocarbyl radical of not more than 8 carbon atoms; and (B) a modifier containing the azo moieties having the formulas:

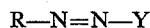

and

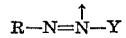

wherein R is a substituted or unsubstituted aromatic or heterocyclic radical and Y is a substituted or unsubstituted aromatic radical.

2. The phototropic composition of claim 1 wherein the azo modifier is azobenezene or a substituted azobenzene having one or more substituents selected from the group consisting of alkyl, aryl, cycloalkyl, alkoxy, aryloxy, amino, dialkylamino, halogen, amido, acylamide, hydroxy, carboxyl, sulfonyl, sulfamido, nitro, sulfonamido, alkylhydroxyalkylamino, cyanoalkylhydroxyalkylamino, alkylcyanoalkylamino, alkyl beta, gamma-dihydroxypropylamino, bis(cyanoalkyl)amino, cyano, carboaryloxy, dialkyl amido, and hydrocarbon radicals which form polynuclear aromatic rings with the benzene rings of said formula.

3. The phototropic composition of claim 1 wherein the modifier is 4,4'-azobisaniline,
4,4'-azobis(dimethylaniline),
N,N-dimethyl-3-chloro-4-azophenylaniline,
N-ethyl-N-methyl-3-hydroxy-4-azophenylaniline,
2-azotolyl-4-azophenylnaphthylamine,
N-[5-[(diethylamino)sulfonyl]-2-methxoyphenyl]-4-[3-[(diethylamino)sulfonyl]phenylazo]-3-hydroxy-2-naphthamide,
4-nitro-4'-(p-hydroxyphenylazo)azobenzene,
N-ethyl-4-(o-tolylazo)toluidine,
1-phenylazo-2-naphthol,
N,N-dimethyl-5-phenylazoaniline,
5-anilino-2-[(4-methoxy-2-benzothiazolyl)azo]phenol,
4-(m-nitro-phenylazo)-resorcinol,
bis(5-hydroxy-2-[(m-nitrophenyl)azo]phenoxy)nickel,
4-(3,3-dimethyltriazeno)-4;
N,N-di-β-hydroxyethyl aminoazobenzene, or
4-(4'-nitrophenylazo)-2-chloro-N-β-hydroxyethylaniline.

4. The phototropic composition of claim 1 wherein in the phototrope R is methyl, Z is hydrogen or an alkoxy-carbonyl group and X and Y are nitro groups, or a nitro group in combination with hydrogen, methoxy group, or a halogen, or halogens.

5. The phototropic composition of claim 1 wherein the phototrope 1',3',3'-trimethyl-8-methoxy-6-nitrospiro[2H-1-benzopyran-2,2'-indoline].

6. The phototropic composition of claim 1 wherein the phototrope is 1'3',3'-trimethyl-6-methoxy-8-nitrospiro[2H-1-benzopyran-2,2'-indoline].

7. The phototropic composition of claim 1 wherein the phototrope is 8-methoxy-5'-methoxycarbonyl-1',3',3'-trimethyl-6-nitrospiro[2H-1-benzopyran-2,2'-indoline].

8. The phototropic composition of claim 7 wherein the modifier is 4-(4'-nitrophenylazo)-2-chloro-N-β-hydroxyethylaniline.

9. The phototropic composition of claim 1 wherein the phototrope is 1',3'3'-trimethyl-6-nitropsiro[2H-1-benzopyran-2,2'-indoline].

10. The phototropic composition of claim 1 dissolved in an inert organic solvent with the concentration of the phototropic composition in the solution ranging from about 0.001% to about 10% by weight.

11. The phototropic composition of claim 10 wherein the solvent is a hydrocarbon solvent.

12. The phototropic composition of claim 1 dissolved in a thermoplastic resin with the concentration of the phototropic composition in the resin ranging from about 0.001% to about 10% by weight.

13. The phototropic composition of claim 12 wherein the thermoplastic resin is a cellulose ester.

14. Process for controlling the phototropic properties of plastic compositions containing a phototrope having the general formula

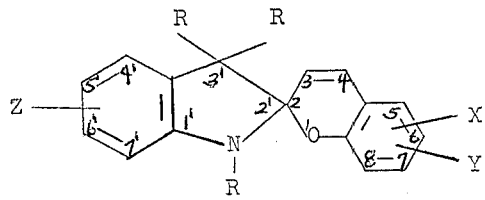

wherein X, Y, and Z are the same or different monovalent radicals selected from the group consisting of hydrogen, carboxyl, alkoxy, nitro, hydroxyl, alkoxycarbonyl, cyano, halogen, amido, alkylsulfone, arylsulfone, acyl and acylamido, in which the hydrocarbyl groups attached to functional moieties containing such have not more than 8 carbon atoms, at least one of said X, Y, Z substituents being other than hydrogen, said substituent Z being located at positions 4' to 7', inclusive, and said substituents X and Y being located at positions 5 to 8, inclusive, and wherein R is a hydrocarbyl radical of not more than 8 carbon atoms by the addition of a modifier containing the azo moieties having the formulas

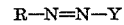

and

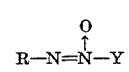

wherein R is a substituted or unsubstituted aromatic or heterocyclic radical and Y is a substituted or unsubstituted aromatic radical to the plastic phototropic composition, the said phototrope being present in about 0.001% to about 10% by weight of said plastic compositions and the said modifier being present in a ratio of phototrope to modifier of about 1:100 to about 100:1.

15. Phototropic composition of claim 1 wherein the modifier comprises 4,4'-azobis(dimethylaniline).

References Cited

UNITED STATES PATENTS

| 3,100,778 | 8/1963 | Berman | 260—326.11 |
| 3,299,079 | 1/1967 | Taylor et al. | 260—326.11 |

OTHER REFERENCES

Kosar, "Light Sensitive Systems," John Wiley & Sons, 1965, pages 175–177.

ALLAN LIEBERMAN, Primary Examiner

U.S. Cl. X.R.

96—90; 106—176; 260—41

UNITED STATES PATENT OFFICE
CERTIFICATE OF CORRECTION

PO-1050 (5/69)

Patent No. 3,485,765  Dated December 23, 1969

Inventor(s) Gordon C. Newland

It is certified that error appears in the above-identified patent and that said Letters Patent are hereby corrected as shown below:

Column 21, Claim 1, the second formula should read as follows:

$$R - N = N - Y$$

and $$R - N = \overset{\overset{O}{\uparrow}}{N} - Y$$

SIGNED AND SEALED

JUN 23 1970

(SEAL)
Attest:

Edward M. Fletcher, Jr.
Attesting Officer

WILLIAM E. SCHUYLER, JR.
Commissioner of Patents